(No Model.)

F. L. P. FISH.
VEHICLE WHEEL.

No. 294,025.   Patented Feb. 26, 1884.

Attest.
Sidney P. Hollingsworth
Walter S. Dodge

Inventor:
Frank L. P. Fish,
by Dodge Son,
Attys.

UNITED STATES PATENT OFFICE.

FRANK L. P. FISH, OF EAST SAGINAW, MICHIGAN.

VEHICLE-WHEEL.

SPECIFICATION forming part of Letters Patent No. 294,025, dated February 26, 1884.

Application filed January 24, 1881. (No model.)

*To all whom it may concern:*

Be it known that I, FRANK L. P. FISH, of East Saginaw, in the county of Saginaw and State of Michigan, have invented certain new and useful Improvements in the Wheels of Vehicles; and I do hereby declare the following to be a full, clear, and exact description of the invention, such as will enable others skilled in the art to which it pertains to make and use it, reference being had to the accompanying drawings, which form part of this specification.

This invention relates to wheels for vehicles; and it consists in a novel construction thereof, whereby elasticity and durability are secured and the ready renewal of the wearing-surfaces of the hub is permitted.

Figure 1:
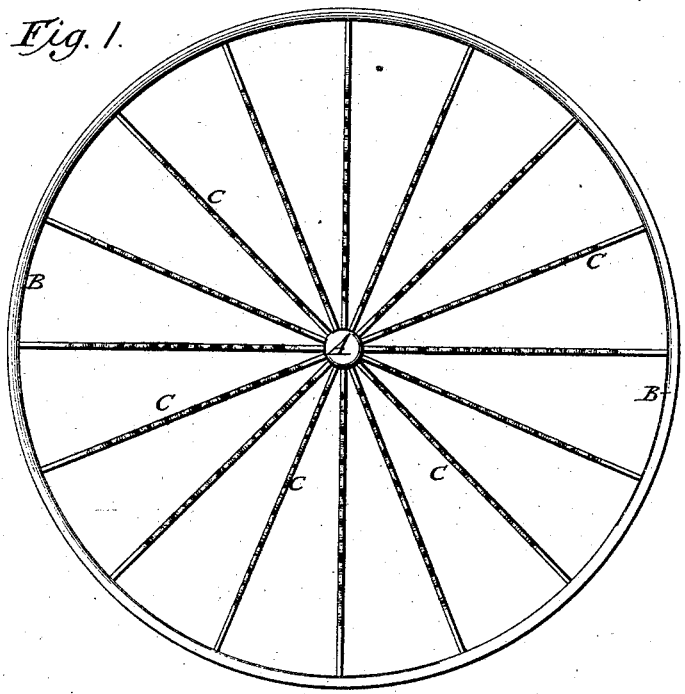
Figure 2:
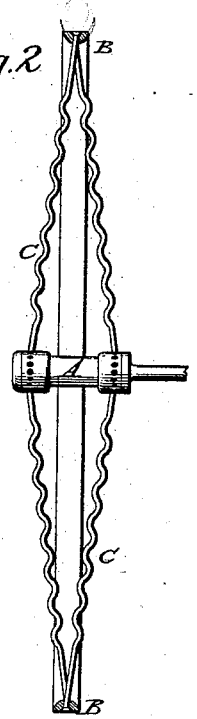

In the accompanying drawings, Figure 1 represents a face view of my improved wheel; Fig. 2, a transverse section through the same, and Fig. 3 a longitudinal section through the hub and axle.

Hitherto numerous attempts have been made to produce a wheel which, by reason of the elasticity of its spokes, should relieve the hub and axle and the vehicle generally of much of the jar and concussion and consequent wear incident to travel over rough or even ordinary roads. Such attempts have not, however, been so successful as to cause the general adoption of any of the various forms of wheels of this class thus far produced, and hence the present construction is adopted with a view to more perfectly accomplishing the object stated and adapting the wheel to all ordinary purposes. With this purpose in view, and to enable the wheel to be readily repaired in case of wear, I form the spokes of steel wire or other elastic metal of circular or other form, and with a series of short curves from end to end in a plane parallel with the axis of the wheel, instead of making one or more such curves at right angles thereto, as heretofore; and I provide the hub with removable brass wearing bands or thimbles, as hereinafter more fully set forth.

A represents the hub of the wheel; B, the rim or felly; and C, the spokes extending from one to the other, preferably headed at their outer ends, and threaded at their inner ends to screw into the hub A. As will be seen in Fig. 2, each spoke is formed with a series of short curves uniting and extending from end to end of the spoke, or practically so, in the direction of the length of the axle or hub, so that in case of the elongation or contraction, such elongation or contraction will take place in a plane parallel with the length of the axle instead of in a direction parallel with the rim or felly of the wheel, as under other constructions. This feature is one of great importance, for the reason that the desired elasticity is afforded without causing the tread or felly of the wheel to move forward or backward under such contraction or elongation, and consequently the tendency to throw the vehicle out of its regular path or movement is overcome. By having the spoke provided with a large number of connecting short curves extending through the length of the spoke, I secure a high degree of elasticity, a wide range of movement, and, at the same time a proper degree of stiffness, so that while the wheel is free to give under any strain or concussion to which it may be subjected, it will possess sufficient rigidity and stiffness to support and carry any load which may be brought upon it. It will readily be seen that if the curvature of the spokes is made in the direction of the movement of the vehicle, the wheel will not possess that degree of rigidity and stiffness which is essential in order to combine with elasticity a proper degree of stiffness to override an obstruction without being momentarily thrown backward or held against forward movement by meeting with even a slight obstruction. Under my construction the wheel possesses the same stiffness against movement or retardation of movement of the felly as is possessed by an ordinary wheel having metal spokes, all movement or play being in a plane at right angles to the direction in which the vehicle travels.

Figure 3:
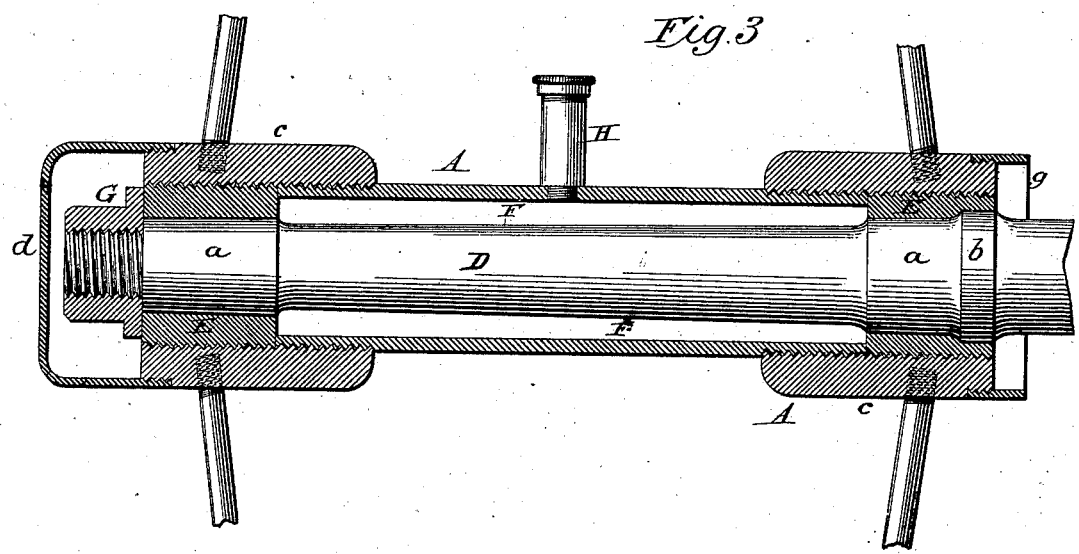

Referring now to Fig. 3, the construction of the hub will be explained. B represents the axle, provided at its inner and outer ends with enlargements *a*, and at the inner side of the inner shoulder or enlargement with a collar, *b*. The hub consists of a middle tubular portion, F, and end thimbles or collars, *c*, threaded and secured upon the ends of the tubular portion F. E E represent thimbles of brass, Babbitt metal, composition, or other material suitable for the wearing-surfaces or bearings, said thimbles having an internal diameter somewhat less than that of the tube F, and being threaded on their exterior to screw into the end thimbles, c, of the hub. The thimbles or bearing-sleeves E are adapted to fit closely upon the enlargements a a and collar b, which collar is designed to prevent the movement of the hub inward upon the axle. Outward movement of the hub is prevented by a nut, G, screwed upon the end of the axle and overlapping the end of the hub. The space between the tube F and axle D forms an oil-chamber capable of carrying a large supply of oil for the lubrication of the wheel, which may therefore run a long time without attention, the oil being supplied to said chamber through a cup or inlet, H, provided with a screw-cap, as shown in Fig. 3. The inner thimble, c, is furnished with a sand-band, g, and the outer thimble is furnished with a threaded dust-cap, d, as shown.

When the wearing-thimbles E become worn, they may be readily unscrewed and replaced by others, and thus the wheel returned to its original condition and made to fit and run closely upon its axle.

The wheel constructed as above described is found to work well in actual use, affording an easy and elastic support for the vehicle, and in consequence of the elasticity of the wheel avoiding the straining and wear of parts incident to the ordinary forms of metal wheels.

I do not claim, broadly, a hub provided with removable brasses, as such have before been made; but my construction I believe to be new and advantageous because of its simplicity and cheapness.

Having thus described my invention, what I claim is—

1. In a wheel, a hub consisting of tube F, thimbles c c, and internal wearing sleeves or thimbles, E, all substantially as shown.

2. The herein-described hub, consisting of tube F, end sleeves, c, inner sleeves or wearing-thimbles, E, sand-band g, and dust-cap d, all substantially as described.

3. A vehicle-wheel consisting of a hub, A, composed of tube E, thimbles c c, and internal bearing sleeves or thimbles E, spokes B, formed with a series of connecting short curves in a plane at right angles to the circumference of the wheel, and a rim or felly connected with the outer ends of the spokes, all substantially as shown and described.

FRANK L. P. FISH.

In presence of—
DANIEL W. PERKINS,
WM. G. GAGE.